July 27, 1954

J. F. COULSON 2,685,012

PROTECTIVE SWITCH FOR MOTOR VEHICLE STORAGE BATTERIES

Filed Dec. 2, 1952

INVENTOR
JOHN F. COULSON

BY *McDowell and Rambo*

ATTORNEYS

Patented July 27, 1954

2,685,012

UNITED STATES PATENT OFFICE 2,685,012

PROTECTIVE SWITCH FOR MOTOR VEHICLE STORAGE BATTERIES

John F. Coulson, Millfield, Ohio

Application December 2, 1952, Serial No. 323,574

3 Claims. (Cl. 200—116)

This invention relates to an improved circuit-controlling switch of the type adapted for application to the terminals of storage batteries employed in energizing electrical systems of motor vehicles.

A primary object of the invention is to provide a terminal post switch for said storage batteries which will function automatically to disconnect an electric circuit energized by an associated battery under abnormal operating conditions in protecting a vehicle from the dangers of fire, and other situations produced by accidental short circuits.

Another object of the invention is to provide a terminal post switch adapted for mounting on a conductive base plate which is adapted to be directly clamped to the terminal post of an associated storage battery, the base plate carrying a terminal post which is normally insulated from the body of the plate but which may be electrically connected therewith by a resiliently movable switch arm, latch mechanism being carried by the plate to maintain the switch arm normally in contact with the plate-carried terminal post, said latch means being mounted on the plate in a manner adapted for effecting arm release by an automatic electrically energized control, the arrangement being such as to produce separation of the switch arm from its position of current-transmitting engagement with the plate-mounted post when emergency conditions occur in the operation of the apparatus.

A further object is to provide a terminal switch for storage batteries of the character set forth wherein the switch arm-releasing latch mechanism is automatically operated by electro-responsive means including a solenoid having a field coil and a movable armature, the armature being operatively connected with the latch means.

For a further understanding of the invention, reference is to be had to the following description and the accompanying drawings, wherein.

Figure 1:
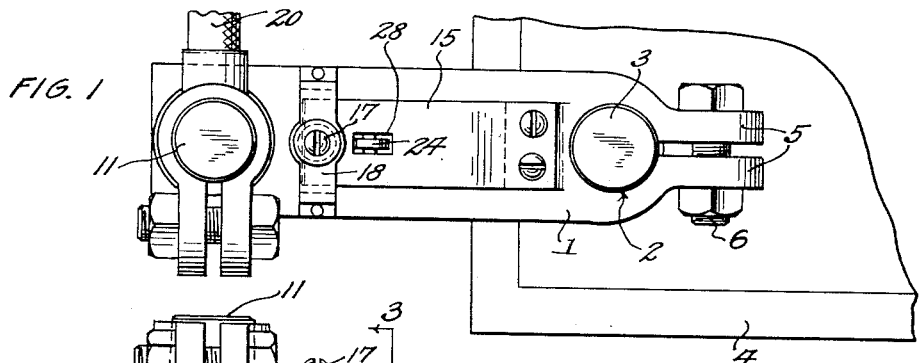
Fig. 1 is a top plan view taken through the improved safety switch device of the present invention.

Referring more particularly to the drawings, the numeral 1 designates a terminal plate which may be formed of metal, or other equivalent material having the capacity to transmit electricity. One end of the plate is formed with an opening 2 in which is positioned the usual tapering post 3 constituting one of the terminals of a storage battery 4, the latter being of the type employed in energizing the electrical engine-starting, lighting and other systems of motor vehicles. Around the opening 2 the terminal post is formed to include spaced jaws 5, which are apertured to receive a bolt or other threaded connection 6. By means of the connection 6 the jaws may be tightened about the outer surfaces of the post 3 and securely held thereon both mechanically and electrically, as will be understood.

The plate 1 extends outwardly from the post opening 2 and the jaws 5, and at its extreme outer end is formed with an opening 7 in which is received an insulating bushing or sleeve 8, the latter forming a part of an insulating strip 9 which is adapted to be placed on the upper surface of the plate 1 at its outer end. Resting on the top of the plate 1 and the strip 9 is the metallic base extension 10 of a second terminal post 11. Normally, the post 11 is electrically insulated from the battery post 3. In this instance, the bottom of the post 11 is formed with a depending axial stud 12 which passes through the sleeve 8 and through an opening formed in an insulating washer 13, the lower end of the stud being threaded for the reception of a binding nut 14.

In order to transmit current from the battery post 3 to the terminal post 11, I employ a resilient leaf-type switch arm, as indicated at 15 in the drawings. One end of this arm is secured to a block-like projection 16, which arises from the upper surface of the plate 1. The normal flexure of the arm 15 maintains its outer or free end in contact with a headed pin 17, the latter being carried on the top of a stirrup 18 forming a part of the plate 1. When contacting engagement exists between the outer end of the arm 15 and the extension 10 of the post 11, it will be noted that current will be transmitted from the battery post 3, through the body of the plate 1, then through the switch arm 15 and to the extension 10. From the post 11 the conductors, indicated at 20, extend to a motor or generator 21, ammeter 22, ignition switch 23, and other electrical parts of a motor vehicle starting, lighting and accessory system, all of standard construction and arrangement.

Figure 2:
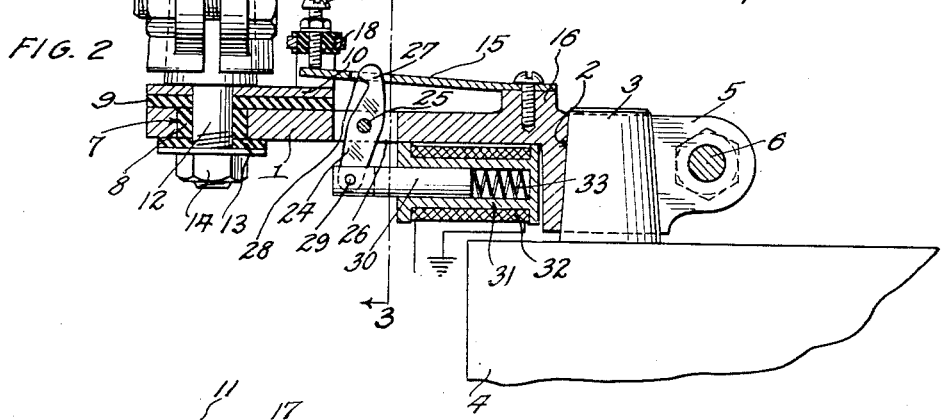
Fig. 2 is a side elevational view with parts in section on a plane through posts 3 and 11 thereof.
Figure 3:
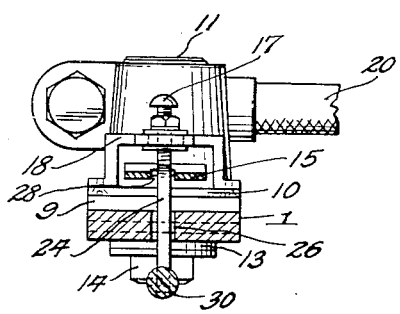
Fig. 3 is a vertical transverse sectional view taken on the plane indicated by the line 3—3 of Fig. 1.
Figure 4:
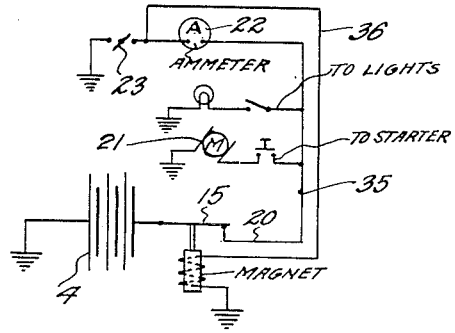
Fig. 4 is a diagrammatic view of electrical circuits associated with my improved protective switch mechanism.

To maintain the switch arm 15 normally in contact with the base extension 10, I employ a pivoted latch device 24, the latter being mounted for rocking movement on a fulcrum 25 carried by the plate 1. The latch is preferably positioned in a slot 26 formed in the plate 1 intermediate of its length. The upper end of the latch device includes a shouldered hook 27, which is adapted to be received in the slot 28 formed in the switch arm 15. The lower end of the latch device, below the fulcrum 25, is pivotally connected as at 29, with the outer end of a slidable armature 30 movably disposed in the axis of a solenoid 31, the latter being carried by the terminal plate 1. The field coil of the solenoid is indicated in the drawings by the numeral 32. A coil spring 33 is preferably mounted in the axis of the field coil in a position, as shown in Fig. 2, to press outwardly on the armature 30, thereby maintaining said latch device in a position holding the switch arm 15 in contact with the post extension 10.

In view of the foregoing, it will be understood that when the main circuit 35 of a motor vehicle is functioning normally current will be transmitted from the post 3 of the storage battery, travelling through the switch arm 15 to the terminal post 11. However, in the event of the presence of a short circuit in any one or more of the conductors 20 current will cease flowing through a supplemental circuit 36 joined with the windings of the solenoid field coil 32, deenergizing the latter and rocking the latch device about its fulcrum 25 so that the switch arm 15 is released from contact with the latch device. This allows the switch arm, because of its inherent resiliency, to move upwardly, so that its outer end will be spaced from the post extension 10, thereby preventing the passage of electrical current from the storage battery to the short circuited conductors 20. By this arrangement an automobile is protected from fires, which are often produced in many cases by the short-circuiting of conductors. Due to the vibration of a motor vehicle when in use, and other causes, the insulation of a conductor wire or cable will become abraded and worn, so that an internal protected wire will be exposed in a manner permitting of its direct contact with associated metal parts. This condition may readily produce a short circuit and heat evolvement, a condition which frequently eventuates in the development of accidental fires and the destruction of motor vehicles. With the use of the present invention the current is cut off at the battery, through the operation of the terminal switch, so that the entire electrical system is protected. The latch 24 may be manually operated, if desired, as in overcoming the attraction of the solenoid in order to move the latch 27 manually to a position releasing the arm 15.

I claim:

1. A protective terminal switch for application to motor vehicle storage batteries, comprising a rigid body of current-conducting composition, a terminal member stationarily carried by said body; means electrically insulating said terminal member from said body; a movable switch arm composed of a current-conducting material; means securing said arm at one end thereof to said body to provide for its resilient movement into and out of current flow-establishing relation with said terminal member; a movable latch device carried by said body, said device when in one position being engageable with said arm to maintain the same in circuit-establishing relation with said terminal member and when in a second position to release said arm from circuit-forming engagement with said member; a solenoid mounted on said body, said solenoid including a field coil and an armature movable in response to current excitations of the coil; means flexibly uniting said armature with said latch device; and spring means mounted on said body and cooperative with said latch device to effect automatic withdrawal movement of the latter from engagement with said switch arm when said field coil is deenergized.

2. In a protective switch for application to storage battery terminal posts, a rigid supporting body of current-conducting composition, said body being formed at one end with a post-receiving and clamping opening and at its opposite end with a terminal-receiving opening; a terminal member positioned in said opening; insulating means electrically separating said terminal member from said supporting body; a resilient switch member movably mounted on said body, said switch member being normally spaced from said terminal member and removed from current-conducting relation therewith; a latch movably mounted on said body for engagement with said resilient switch member to hold the same in or to release it from circuit-establishing contact with said terminal member; a solenoid mounted on said base, said solenoid including a field coil and an armature movable in one direction in response to electrical energization of said field coil; means articulately uniting said armature with said latch to cause the latter to be maintained in a position holding the switch member in circuit-completing engagement with said terminal member when the field coil of the solenoid is energized; and spring means coacting with said armature and latch to retract the latter to a position in which said switch member is released to assume a circuit-opening position when said coil is deenergized.

3. In a control switch for electrical circuits; a rigid supporting body of current-conducting composition; a terminal carried by said body; means electrically insulating said terminal from said body; a resilient switch member of current-conducting composition movably mounted on said body in current-transmitting relationship therewith, said member being normally spaced from said terminal and removed from electrical contact therewith; a latch movably mounted on said body for controlling the operating positions of said switch member in relation to said terminal; a solenoid carried by said body, said solenoid including a field coil and an armature slidably movable in one direction in the coil in response to electrical energization thereof; and spring means coacting with said armature to move the latter in a direction opposed to that produced by the energizing of said coil upon deenergization of the latter, movement of the armature under the action of said spring means serving to remove said latch from holding engagement with said switch member.

References Cited in the file of this patent

UNITED STATES PATENTS

| Number | Name | Date |
| --- | --- | --- |
| 1,615,106 | Bethea | Jan. 18, 1927 |
| 1,636,037 | Beall et al. | July 19, 1927 |
| 1,891,676 | Lansing | Dec. 20, 1932 |
| 1,995,946 | Schild | Mar. 26, 1935 |
| 2,028,077 | Parsons | Jan. 14, 1936 |
| 2,545,965 | McCamon | Mar. 20, 1951 |